Feb. 3, 1942. G. L. OLSON 2,271,568
RESILIENT TORQUE DEVICE
Filed March 29, 1940 2 Sheets-Sheet 1
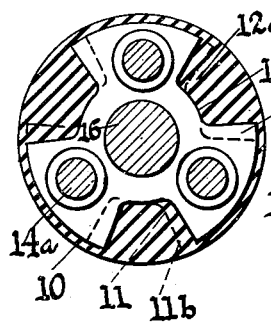
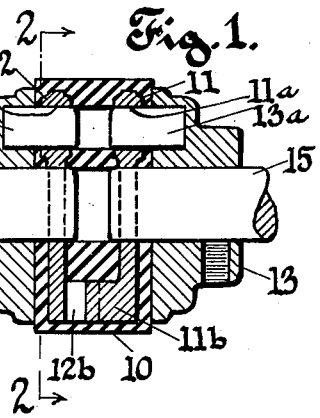
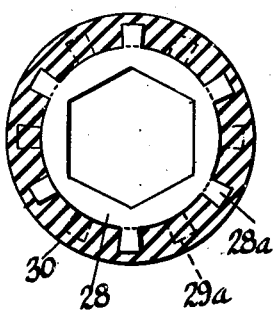
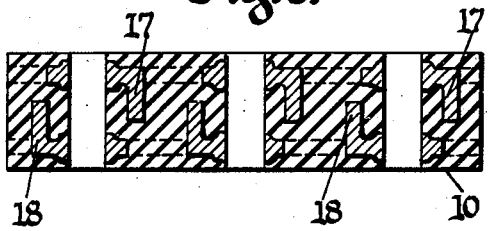
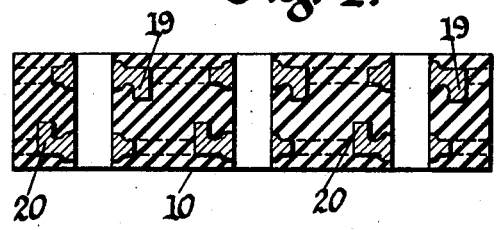
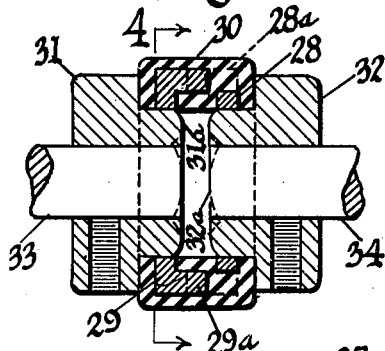
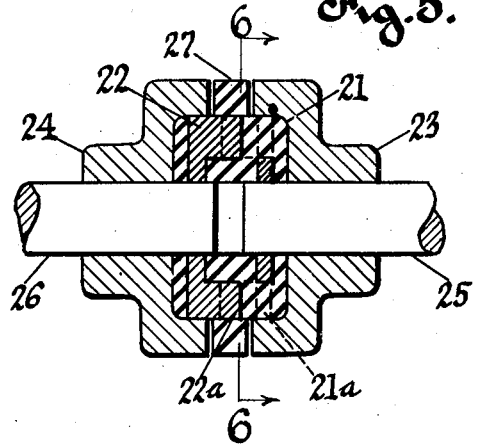
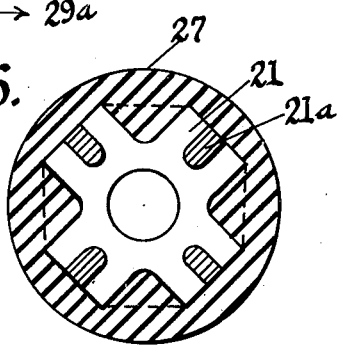
Inventor
Gordon L. Olson.
By Edert R. Llewellyn.
Attorney.

Feb. 3, 1942.  G. L. OLSON  2,271,568
RESILIENT TORQUE DEVICE
Filed March 29, 1940   2 Sheets-Sheet 2
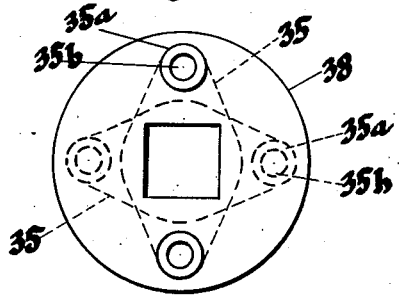
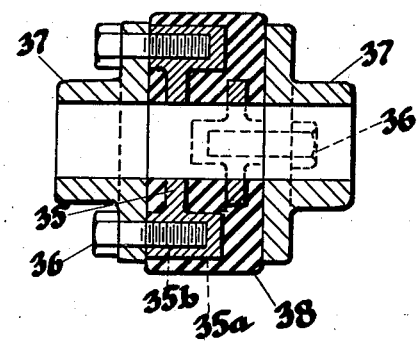
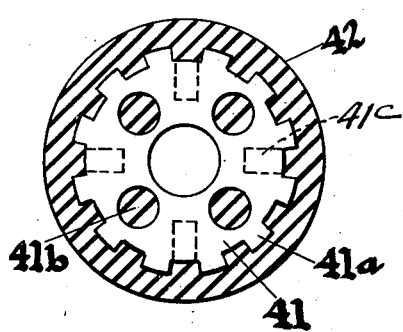
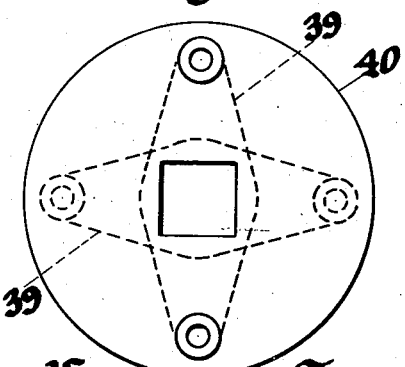
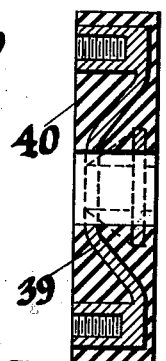
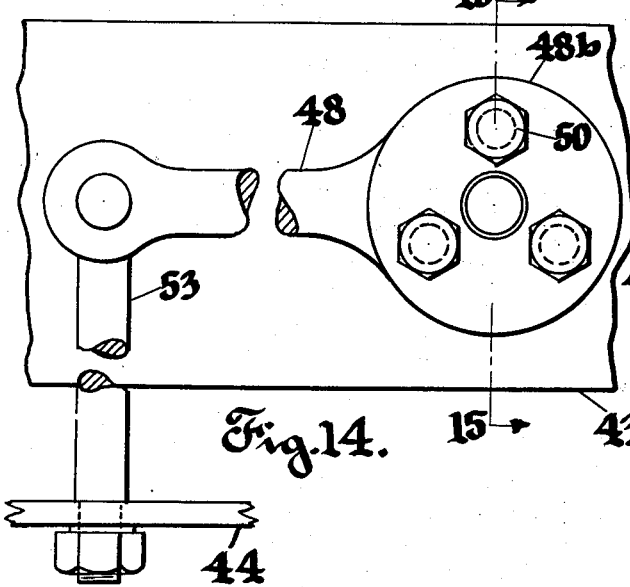
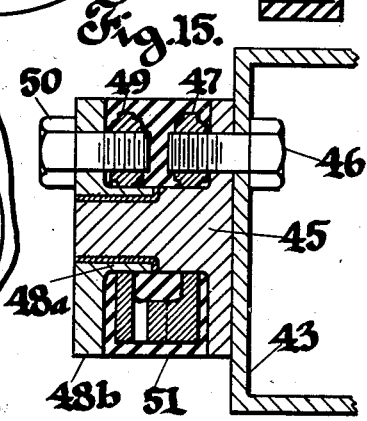
Inventor
Gordon L. Olson
By Ernest R. Llewellyn
Attorney Patented Feb. 3, 1942

2,271,568

UNITED STATES PATENT OFFICE 2,271,568

RESILIENT TORQUE DEVICE

Gordon L. Olson, Arlington, Mass.

Application March 29, 1940, Serial No. 326,686

4 Claims. (Cl. 64—11)

This invention relates the construction of a device that will permit of a yielding torsional movement between opposed members and in particular to a construction that may be utilized in the forming of a coupling whereby the ends of coaxial shafts may be secured in a driving relation in a manner that will permit of a misalignment of the opposed shafts together with a yielding torsional movement.

One of the primary objects of the present invention is to provide a simple, rugged and efficient device that will permit of a combined coaxial misalignment and torsional movement between two members.

Another object of the invention is to provide a device that may be arranged to withstand a predetermined torque before reaching a shearing point or arranged to drive in a positive relation after the resiliency of the device has been exhausted.

A further object of the invention is to provide a device that may be readily and conveniently assembled and disassembled for the inspection and replacement of parts of the device.

The foregoing objects are stated as a general illustration and are not to be construed as limiting the invention thereto as other objects will be apparent from the drawings and following description of the invention with its novel combination and arrangement.

In the accompanying drawings I have shown a preferred form of the device together with a practical embodiment of the device and in a manner that is intended to enable those skilled in the art to understand the construction and operation thereof. The illustrated embodiments of the device are to be understood as merely showing some of the uses to which the device is applicable and not as limiting the device thereto.

Referring to the drawings:

Fig. 1 is a longitudinal section of the invention in assembled relation with the ends of opposed rotative members.

Fig. 2 is a transverse section taken substantially along line 2—2, Fig. 1.

Fig. 3 is a developed section of the resilient element of the device shown at Fig. 1.

Fig. 4 is a view corresponding to Fig. 7 but shows a modified form of some of the parts.

Fig. 5 illustrates another modified form of the device shown at Fig. 1.

Fig. 6 is a transverse section taken substantially along line 6—6, Fig. 5.

Fig. 7 is a longitudinal section showing a modified form of the device illustrated at Fig. 1.

Fig. 8 is a transverse section taken substantially along line 4—4, Fig. 7.

Fig. 9 is still another modification of the device shown at Fig. 1.

Fig. 10 is an end view of the device shown at Fig. 9.

Fig. 11 is a further modified form of the device illustrated at Fig. 1.

Fig. 12 is an end view of the parts shown at Fig. 11.

Fig. 13 is a modified form of a rigid insert that may be associated with the resilient element.

Fig. 14 is a side elevation of the device in association with parts of an automobile or the like.

Fig. 15 is a vertical section taken substantially along line 15—15, Fig. 14.

The resilient housing 10, Fig. 1, is preferably moulded about the opposed rigid inserts, 11, 12, which are disposed in a spaced relation to one another. Each insert 11, 12 is provided with a plurality of bores 11a, 12a that also extend through the housing 10. These bores 11a, 12a, are adapted to receive driving pins 13a, 14a secured in a pair of flanged couplings 13, 14 secured to the ends of the shafts 15, 16 that are to be connected in driving relation.

As best illustrated at Fig. 2, the periphery of each insert 11, 12 is provided with a series of notches 12d so as to permit the inserts to be more firmly embedded in the resilient material that forms the housing 10. In this instance the opposed inserts 11, 12 are each provided with a series of inwardly extending projections 11b, 12b that are adapted to overlap the circumferential path of the opposed projection and further, the projections of the opposite inserts 11, 12 are staggered as illustrated at Fig. 2. It is to be noted that should the resilient housing 10 be required to yield to an excessive torque strain or movement between the shafts the projections 11b, 12b will engage one another in a positive driving relation.

Fig. 3 shows a developed section of the housing 10 with an arrangement of opposed inwardly extending projections 17, 18 arranged to be engaged with one another in a positive driving relation.

In instances where it is desirable to establish a safety torque factor, the projections 19, 20 may be formed and disposed in a manner that will permit of their passing one another and thus allow the resilient housing 10 to fracture and disconnect the opposed shafts.

The principles of the foregoing structure may be modified in many respects to suit various requirements and conditions. For example at Fig. 5 the peripheries of the opposed inserts 21, 22 are provided with a series of flat faces 21a, 22a adapted to engage in driving relation with octagonal openings formed in the flanged couplings 23, 24 secured to the respective driving and driven shafts 25, 26. These modified inserts 21, 22 are disposed in a resilient housing 27 with their projecting flat faces 21a, 22a extending inwardly to function in the manner previously stated.

In the device illustrated at Figs. 7 and 8, the inserts 28, 29 are each provided with a series of combined outwardly and inwardly extending projections 28a, 29a that are embedded in the material of the resilient housing 30. In this illustrated arrangement the inserts 28, 29 are each provided with hexagonal openings adapted to engage with corresponding projections 31a, 32a of the flange couplings 31, 32 secured to the opposed shafts ends 33, 34.

Fig. 9 illustrates another modified form of my rigid insert 35 and having enlarged portions 35a provided with threaded bores 35b adapted to receive the threaded portion of cap screws 36 by means of which the coupling members 37 are secured in driving relation with the resilient housing 38 in which the rigid inserts 35 are embedded.

The rigid inserts 39 illustrated at Figs. 11, 12, are similar to those shown in Fig. 9 but in the instance the opposed inserts are designed to be disposed in a nested form in the narrow resilient housing 40.

At Fig. 13 is shown still another modified form of insert 41 and wherein the periphery of the insert is provided with a toothed formation 41a and openings 41b in which the material of the resilient housing 42 may engage in a driving relation with the insert 41. The inwardly projecting lugs 41c of this insert 41 may be arranged in any of the forms previously mentioned.

As an example of the many uses to which my device may be adapted, at Figs. 14 and 15, the device is embodied with a frame 43 and a portion 44 of a spring of an automobile and in a manner that forms a shock absorber. In this embodiment the trunnion 45 is secured to the frame portion 43 by means of screws 46. These screws 46 extend through and engage with a rigid insert 47. The bearing portion 48a, of the horizontally extending lever 48, is rotatably mounted on the trunnion 45 and this portion 48a is also provided with a flange 48b that is secured to an opposed rigid insert 49 by means of screws 50. As heretofore described, the inserts 47, 49 are embedded in the material forming the resilient housing 51.

Pivotally connected at 52 to the lever 48 is a rod 53 that is secured to the spring portion 44.

Movement of the spring portion 44 will tend to cause an oscillating movement of the lever 48 which will be resiliently restrained by the coaction of the rigid inserts embedded in the resilient housing 51.

Having thus described my invention, what I claim is:

1. In combination with a driving and driven member, a slidable element adapted to be secured to the end portion of each of said driving and driven members, projections extending from each of said slidable elements, a member disposed between said slidable elements, said member embodying a resilient housing with opposed rigid members secured in said housing in a spaced-apart relation with projections extending from each of said rigid members and embedded in said housing, a central bore extending through said housing and adapted to receive said driving and driven members, together with openings in said housing adapted to receive the projections of said slidable elements.

2. The combination as recited in claim 1 and wherein said projections extend inwardly in a direction toward one another and are offset from each other in a circumferential direction.

3. In combination with a driving and driven member, a slidable element adapted to be secured to the end portion of each of said driving and driven members, a projection extending from each of said slidable members, a member disposed between said slidable elements, said member embodying a resilient housing with opposed rigid members secured in said housing in a spaced-apart relation, projections extending inwardly in a direction toward one another from the face of each of said rigid members, said last projections being embedded in said housing and offset from each other in a circumferential direction, the projections of one rigid member extending into the rotative path of the projections of the other rigid member, a central bore extending through said housing and rigid members and adapted to receive said driving and driven members, together with means for engaging said first projections with said housing.

4. In combination with a driving and driven member, slidable elements having a bore extending therethrough adapted to be secured to the end portion of each of said driving and driven members, projections extending from each of said slidable elements, a member disposed between said slidable elements, said last member embodying a substantially solid resilient housing with opposed rigid members embedded in said housing in a spaced-apart relation and adapted to receive the projections of said slidable elements said rigid members having projections extending from each of said rigid members and also embedded in said housing, and whereby said rigid members and housing are engaged in a driving relation.

GORDON L. OLSON.